INVENTOR.
JOHN S. ECKERT
ATTORNEY

INVENTOR.
JOHN S. ECKERT

United States Patent Office 3,419,251
Patented Dec. 31, 1968

3,419,251
DISTRIBUTOR
John S. Eckert, Silver Lake, Ohio, assignor to U.S. Stoneware, Inc., Tallmadge, Ohio, a corporation of Massachusetts
Continuation-in-part of application Ser. No. 465,489, June 21, 1965. This application Oct. 19, 1966, Ser. No. 592,248
3 Claims. (Cl. 261—40)

ABSTRACT OF THE DISCLOSURE

Apparatus for distributing liquid, having a conduit with pressure-regulating orifices spaced therealong, and a section of hollow tube of larger diameter than the orifice, connected to the output side of the orifice to reduce the velocity of the liquid before discharge, and valve means movable in response to pressure changes in said conduit to control flow through said orifices.

---

Figure 1:
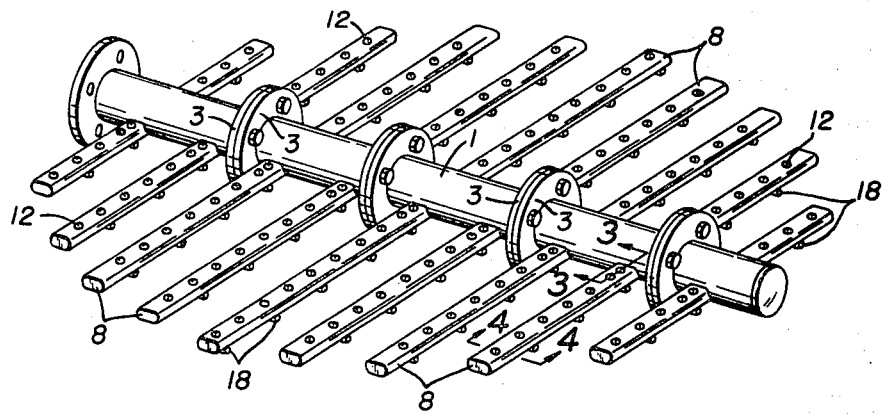

This application is a continuation-in-part of my application Ser. No. 465,489 filed June 21, 1965, now abandoned.

This invention relates to a distributor with orifices of extended flow range, for a gas- and liquid-contacting tower.

Contacting towers contain various types of packing to expose a large surface of the liquid which flows down through the tower, to the gas which rises in the tower. One or more distributors are usually provided within a tower to supply the liquid evenly over the entire cross section of the tower.

The volume of liquid supplied to a tower varies from time to time, and for this reason it has been difficult to cause a uniform distribution of the liquid over the entire cross-sectional area of the tower.

According to this invention the liquid is supplied under pressure through a closed distributor conduit, and is distributed from this through relatively short velocity-retarder tubes which conduct the liquid from the conduit to the bed of packing elements. Usually there is an adjustable valve at each of the junctures of the velocity-retarder tubes and the conduit. However, the openings into the velocity-retarder tubes may be sufficiently smaller than the cross section of these tubes so that they provide permanent valved openings, or such openings may be in replacement elements providing openings of different sizes so that the flow rate may be adjusted by using elements with an opening of given size. The pressure of the liquid in the conduit may range up to 5 pounds per square inch or more. The valved conduits are flexible and expandable. If there is no valve in the openings into the velocity-retarder tubes, the conduits need not be flexible and expandable because the amount of liquid distributed through each depends upon the pressure within the conduit. If valves are provided in the orifices at the junctures of the tubes and the conduit, they are advantageously attached to the top of the conduit so that they are opened when the pressure within the conduits is increased and the conduits swell, and they tend to close as the pressure is reduced. Thus, they are closed or nearly closed at atmospheric pressure so that there is very little flow through them, for example, as low as ½ pint per minute per tube; but as the conduits are expanded by increase in the pressure the valves are lifted and liquid flows from the conduit and is distributed over the packing through the velocity-retarder tubes at rates as high as 5 gal. per minute per tube. Although the pressure may vary from time to time, it is always uniform throughout all of the one or more conduits, so that the valves are opened uniformly to a greater or less extent, varying the flow rate simultaneously and uniformly throughout all of the tubes fed from a single conduit and also through all of the conduits if there are more than one. By this arrangement, the flow rate is the same through all of the orifices at all times, although it may vary from time to time, and uniform treatment of the liquid and gas throughout the whole cross-sectional area of the tower is assured.

Figure 2:
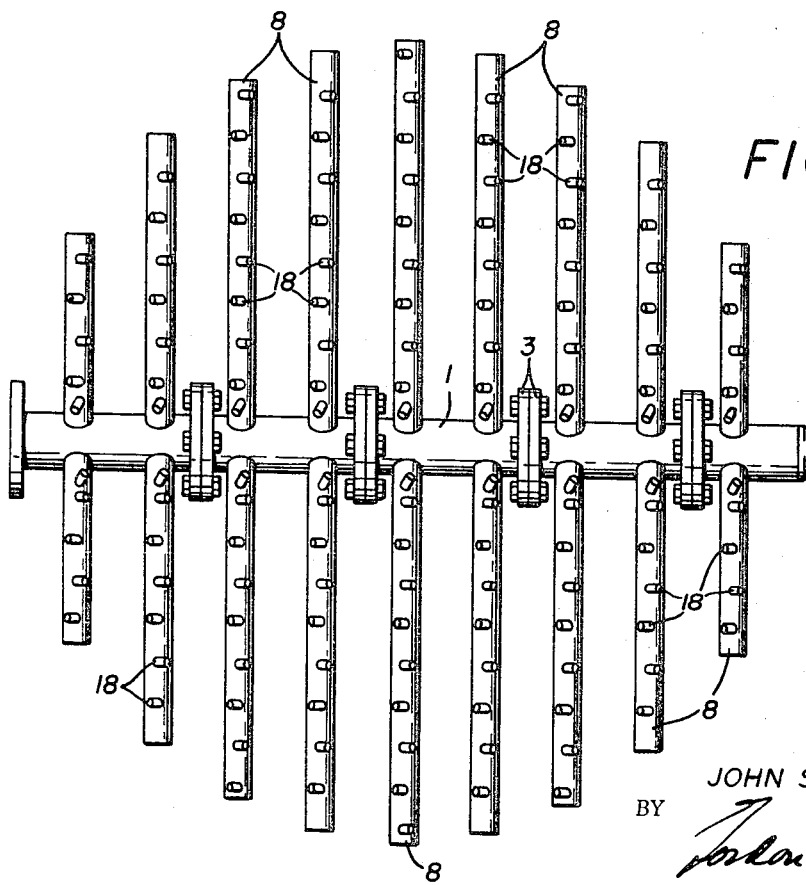
Figure 3:
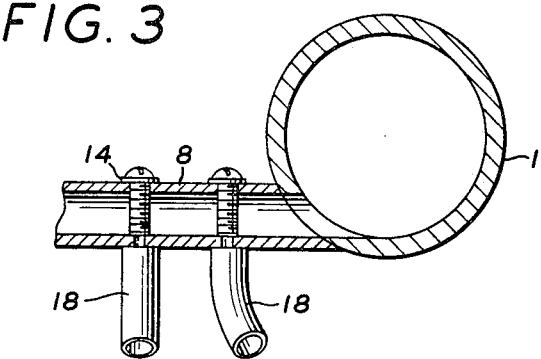
Figure 4:
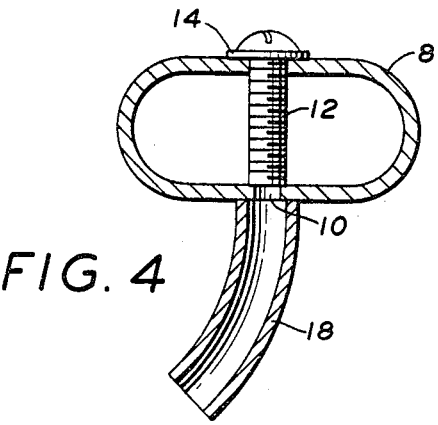
Figure 5:
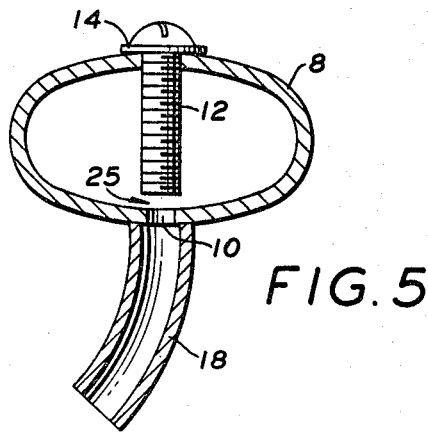
Figure 6:
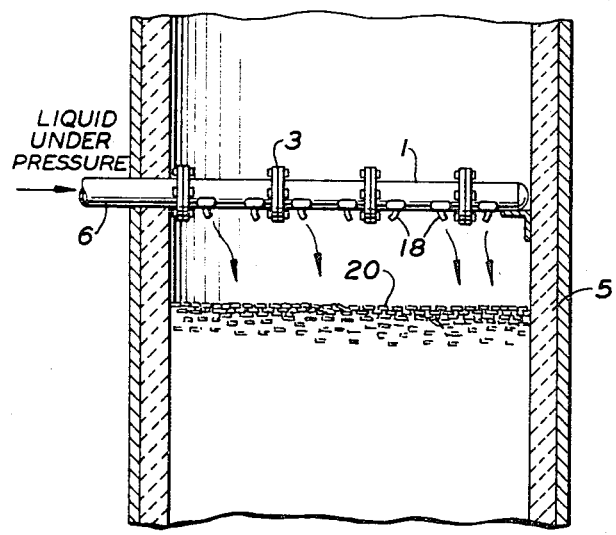
Figure 7:
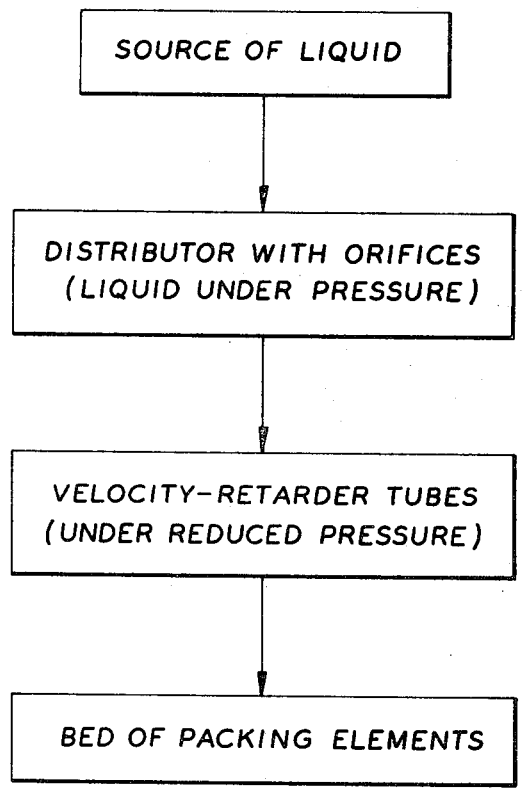
Figure 8:
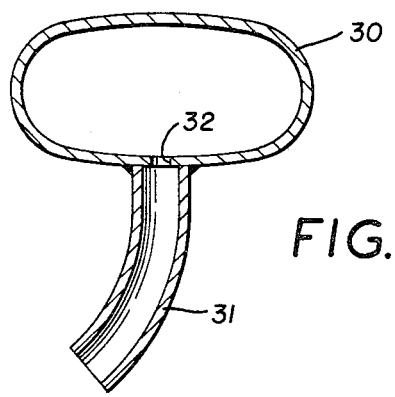
Figure 9:
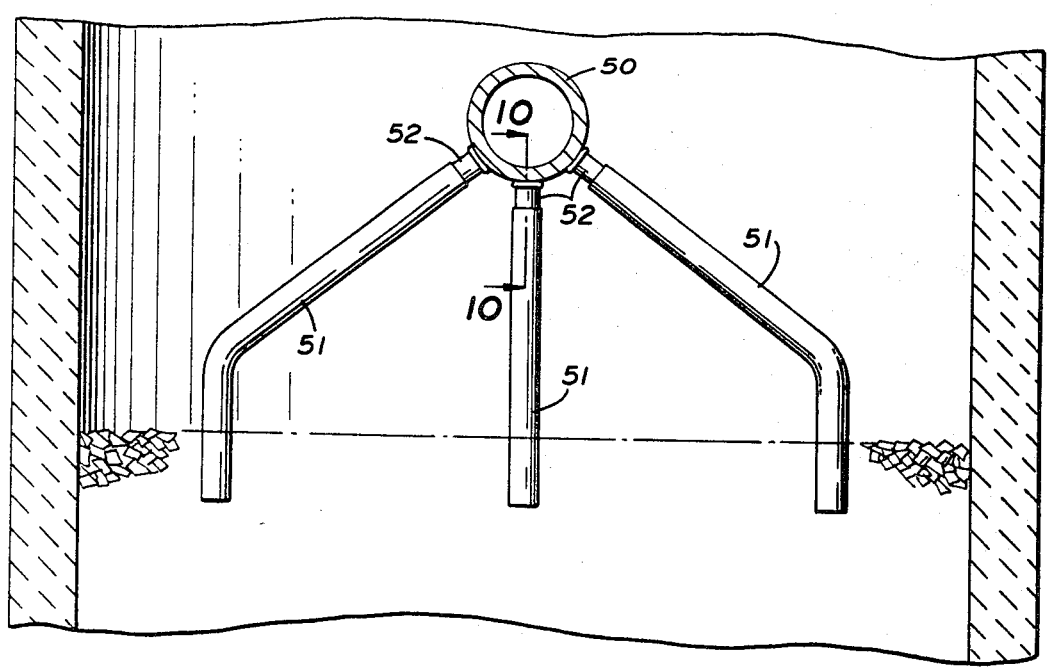
Figure 10:
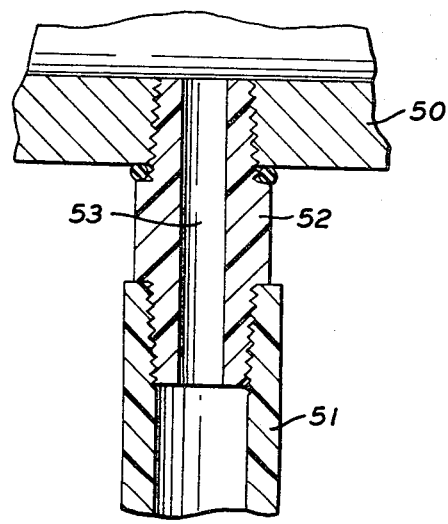

The invention is further described in connection with the showing of a ladder form of distributor, in the accompanying drawings, in which:

FIGURE 1 is a view in perspective of a preferred form of distributor;
FIGURE 2 is a bottom view of this distributor;
FIGURE 3 is an enlarged sectional view on the line 3—3 of FIGURE 1;
FIGURES 4 and 5 are sectional views on the line 4—4 of FIGURE 1, on a much enlarged scale, showing the valve closed and open, respectively;
FIGURE 6 is a section through a tower showing the distributor installed in it;
FIGURE 7 is a flow sheet;
FIGURE 8 is an enlarged sectional view through a conduit and velocity-retarder tube in which no added valve is used;
FIGURE 9 is a section through a branch conduit connected to velocity-retarder tubes through replaceable valve elements; and
FIGURE 10 is an enlarged detail of the replaceable valve element, on line 10—10 of FIGURE 9.

It is not necessary that the distributor be of the ladder type. The conduits may be arranged according to any suitable configuration. These conduits may be made of metal or plastic. They must be closed.

The distributor shown comprises a single feeder conduit 1. This is made in sections, the flanges 3 of which may be readily bolted together after the sections have been brought into the tower. Alternatively this feeder conduit may be in one piece. FIGURE 6 shows a tower 5 with the feeder conduit 1 bolted to the flanged feeder pipe 6.

Each branch conduit 8 (FIGURES 1 to 6) is provided along its bottom with orifices 10. Each screw 12 is threaded through the top of the conduit, and washers 14 are provided of just the right height so that the bottom of each screw just seats over its opening (FIGURE 4) or, alternatively, so that the bottom of each screw is spaced the same minimum distance from the opening. As the pressure on the liquid increases, the pipe becomes rounder (FIGURE 5) opening the valve or increasing the amount it is opened, thereby increasing the flow rate through all orifices as the conduit is inflated. It decreases on deflation of the conduit. The bottoms of the screws are flat to prevent formation of spray when the orifices are almost closed.

Velocity-retarder tubes 18 convey liquid away from the orifices onto the bed. Alternate tubes are advantageously faced in opposite directions to spread the liquid over the bed 20. FIGURES 2, 3 and 6 show how extra tubes 18 are located near the feeder conduit to direct liquid under the conduit. Although such velocity-retarder tubes as just described are not essential, it is desirable to provide them, not only in order to assist in directing the liquid to all parts of the bed, but also to minimize splashing of the liquid because of their velocity-retarding effect. Splashing creates an objectionable spray of liquid which may be carried up through the tower.

The following illustrates how the valves function, but is purely exemplary. If, at a liquid pressure of one pound per square inch throughout the system, a valve opening 25 is the equivalent of an orifice 1/16 inch in diameter, it will deliver about 0.08 pound per minute of liquid. Assume that at 20 pounds per square inch liquid pressure the opening is increased to the equivalent of an orifice 1/8 inch in diameter (because of inflation of the tube, which raises the screw), and this opening will deliver 1.4 pounds per minute of liquid. This gives a flow ratio of 18.1 over a pressure ratio of 20–1. If the variable flow were not used, the flow of liquid would be about 0.3 pound per minute at one pound per square inch and the flow ratio would be only 4.5:1 over a pressure ratio of 20:1.

Furthermore, the opening and closing of the valves is a desirable method of dislodging any matter which tends to foul the orifices.

Various types of valves operable by the ambient pressure may be used. For instance, with a perfectly cylindrical rigid conduit, the valves may be mounted on bellows which surmount the conduits and open into the conduits. Such conduits might be square in cross section.

FIGURE 7 is a flow sheet which indicates that the liquid in the conduit is under pressure, and the flow of liquid through the velocity-retarder tubes is under reduced pressure and may flow by gravity.

FIGURE 8 is a section through a conduit 30 which is of the same structure as the conduit 8 of the prior figures, and the velocity-retarder tubes 31 are the same as the tubes 18. There is no adjustable valve, the opening 32 serving as a valve. The size of the opening 32 may be different in different installations, although all openings in any conduit will be of the same size. Since there is no mechanical valve, the conduit may be of any desired cross section.

FIGURES 9 and 10 show how the branch conduit 50 may be connected with retarder tubes 51 through a replacement valve element 52 preferably made of Teflon (tetrafluoroethylene) or other resistant plastic, all of the elements connected to the branch conduit at any one time having the same size opening through them. Each valve element is threaded at both ends and is screwed into the branch conduit and tube. The size of the opening 55 is the same in all elements in use at any one time. This insures a desired flow rate to and through all retarder tubes. With this arangement, a large number of branch conduits and retarder tubes can be made at one time and put in storage. When any number are wanted for an installation they are removed from storage and valve elements 52, all with opening 55 of a given size, are used in the installation. Also, by replacing elements with an opening of one size with elements having an opening of different size, any desired flow rate is obtained.

The invention is covered in the claims which follow.

I claim:

1. A section of a ladder distributor for a liquid-gas contacting tower which comprises an enclosed feeder conduit section which is open at each end, with each end provided with an outwardly extending flange, at least two branch conduits attached perpendicularly to each side of the feeder conduit, each of said feeder conduits being a flattened cylinder with spaced orifices adjacent its bottom throughout its length, a screw threaded into the top of each feeder conduit above each orifice with its bottom serving as a valve to vary the rate of flow of liquid through the orifice as the pressure of the contents of the conduit is increased and decreased, and a washer under the head of each screw which spaces the bottom of each screw in a desired relation to its orifice.

2. Apparatus for distributing liquid substantially uniformly throughout the cross-section of a liquid-gas contact tower, comprising a closed, pressurizable conduit characterized as a cylinder having opposed, flattened wall portions, a plurality of pressure-regulating orifices spaced along one of said flattened wall portions of said conduit, a plurality of valve means depending from the other of said flattened wall portions into registry with said orifices and velocity-retarding means communicating with each of said orifices, each said means consisting of a section of tube of larger diameter throughout its length than the diameter of its corresponding orifice, one end of said tube being in liquid sealing engagement with its corresponding orifice and the other end of said tube being open and defining the ultimate discharge of distributed liquid to said contact tower.

3. A liquid-gas contact tower, comprising the apparatus defined in claim 2 and means supplying liquid under pressure to said conduit.

References Cited

UNITED STATES PATENTS

| | | | |
|---|---|---|---|
| 2,019,922 | 11/1935 | McLellan | 239—542 X |
| 2,253,261 | 8/1941 | Bacon | 261—94 |
| 2,470,652 | 5/1949 | Scofield | 261—94 |
| 2,485,849 | 10/1949 | Simmons. | |
| 2,530,002 | 11/1950 | Coy. | |
| 2,621,032 | 12/1952 | Schellenburg | 261—98 |
| 2,755,133 | 7/1956 | Conrad | 239—534 |
| 3,143,581 | 8/1964 | Walter | 261—111 X |
| 3,199,791 | 8/1965 | Chapin | 239—65 X |
| 3,263,976 | 8/1966 | Hilinski | 261—98 |

FOREIGN PATENTS

| | | |
|---|---|---|
| 356,516 | 9/1931 | Great Britain. |
| 764,559 | 12/1956 | Great Britain. |

OTHER REFERENCES

Wyss; German Printed Application No. 1,100,053, February, 1961.

HARRY B. THORNTON, *Primary Examiner.*

U.S. Cl. X.R.

137—508; 261—71, 97, 98; 239—450, 534, 523, 556, 566